United States Patent [19]

Ikeda et al.

[11] Patent Number: 4,785,037

[45] Date of Patent: Nov. 15, 1988

[54] GASKET COMPOSITION FOR CAST POLYMERIZATION

[75] Inventors: Hiroyuki Ikeda, Toyama; Suehiro Tayama, Otake, both of Japan

[73] Assignee: Mitsubishi Rayon Company Ltd., Tokyo, Japan

[21] Appl. No.: 942,439

[22] Filed: Dec. 16, 1986

[30] Foreign Application Priority Data

Dec. 18, 1985 [JP] Japan ................................. 60-285085

[51] Int. Cl.$^4$ ................................................ C08K 5/49
[52] U.S. Cl. .................................... 524/114; 524/145; 524/296; 524/297; 524/399; 524/400; 524/569
[58] Field of Search ............... 524/114, 145, 296, 297, 524/399, 400, 569

[56] References Cited

U.S. PATENT DOCUMENTS 4,584,241 4/1986 Choi et al. ........................... 524/569
4,623,686 11/1986 Hürnik et al. ....................... 524/569
4,636,654 1/1987 Helton ................................. 524/569

OTHER PUBLICATIONS

Riser et al., "Epoxy Acids and Salts as Stabilizers for Vinyl Plastics" Aug. 1963, pp. 729-734.

*Primary Examiner*—Joseph L. Schofer
*Assistant Examiner*—Peter D. Mulcahy
*Attorney, Agent, or Firm*—Cushman, Darby & Cushman

[57] ABSTRACT

Disclosed is a composition suitable for the preparation of a gasket for use in the production of shaped resin articles by cast polymerization. The composition is comprises (A) 100 weight parts of a vinyl chloride resin, (B) 30 to 70 weight parts of a carboxylic acid ester or phosphoric acid ester plasticizer, (C) 0.5 to 10 weight parts of an epoxy type plasticizer and (D) 0.1 to 5 weight parts of a barium- or zinc-containing stabilizer.

16 Claims, No Drawings

GASKET COMPOSITION FOR CAST POLYMERIZATION

BACKGROUND OF THE INVENTION (1) Field of the Invention

The present invention relates to a composition suitable for the preparation of a gasket for use in the production of shaped resin articles by cast poymerization.

(2) Description of the Related Art

Cast polymerization has been widely utilized for the preparation of shaped articles of methacrylic resins, styrene resins, and unsaturated polyester resins. According to this polymerization process, gaskets composed of a vinyl chloride resin are interposed between two confronting inorganic glass or metal sheets to form a casting mold, and a polymerizable compound is cast in this casting mold and polymerized.

In this process, a tube of soft polyvinyl chloride containing a plasticizer is often used for the gasket. In this case, low-molecular-weight compounds of additives contained in the gasket, such as a plasticizer and a stabilizer, are eluted by the polymerizable compound to contaminate the casting surfaces of the mold sheets. Accordingly, when the mold sheet peeled after completion of the polymerization is used again, it must be washed and cleaned, and therefore, a great deal of labor is required, resulting in an increase of the manufacturing cost.

As means for obviating this disadvantage, there have been proposed a method in which the surface of a gasket substrate is non-adhesively wrapped by a film so that the gasket is not eluted by the polymerizable compound (Japanese Examined Patent Publication No. 43-29,675), and a method in which a polyfunctional compound is coated and cured on the surface of the gasket substrate (Japanese Examined Patent Publication No. 57-4,658. In the former method, however, since the gasket substrate is wrapped by the film, the sealing property is not satisfactory and complete prevention of the elution of the additives is impossible. In the latter method, since the surface of the gasket is covered with a crosslinkable cured coating, elution of the additives can be prevented, but since the compound coated on the surface of the gasket is expensive and a curing equipment is necessary, the manufacturing cost is increased. Moreover, since the resin composition of the gasket substrate is different from the resin composition of the crosslinked cured coating on the surface, the gasket cannot be utilized as a part of the gasket-forming material when, after the polymerization, the gasket is cut and recovered and is again molded into a gasket.

SUMMARY OF THE INVENTION

Under this background, it is a primary object of the present invention to provide a gasket composition for cast polymerization, which makes it possible to prevent contamination of the casting surface of a mold sheet during the cast polymerization.

In accordance with the present invention, there is provided a gasket composition for cast polymerization, which comprises (A) 100 parts by weight of a vinyl chloride resin, (B) 30 to 70 parts by weight of a plasticizer selected from carboxylic acid esters and phosphoric acid esters, (C) 0.5 to 10 parts by weight of an epoxy type plasticizer and (D) 0.1 to 5 parts by weight of a stabilizer composed of at least one member selected from barium-containing compounds and zinc-containing compounds.

DESCRIPTION OF THE PREFERRED EMBODIMENTS

One of the important characteristics of the gasket composition for cast polymerization (hereinafter referred to as "gasket composition") according to the present invention is that specific additives are incorporated in a vinyl chloride resin. As the vinyl chloride resin (A) constituting the gasket composition of the present invention, there can be mentioned polyvinyl chloride, and copolymers of at least 80% by weight of vinyl chloride and not more than 20% by weight of a copolymerizable monomer. The copolymer includes, for example, an ethylene/vinyl chloride copolymer, and an ethylene/vinyl acetate/vinyl chloride copolymer. A vinyl chloride resin composed mainly of vinyl chloride, which has flexibility, is preferred. Conventional additives may be incorporated into these vinyl chloride resins, so long as attainment of the object of the present invention is not hindered. Preferably, a vinyl chloride resin free of such additives is used.

As the carboxylate or phosphate plasticizer (B) used for the gasket composition of the present invention, there can be mentioned TBP (tributyl phosphate), DBP (dibutyl phthalate), DOA (dioctyl adipate), DOP (dioctyl phthalate), ATBC (acetyltributyl citrate), TOP (trioctyl phosphate), and TOTM (trioctyl trimellitate). From the viewpoint of heat resistance, DOA, DOP, ATBC, TOP, and TOTM having a high molecular weight and a high boiling point are preferably used.

As specific examples of the epoxy type plasticizer (C) used for the gasket composition of the present invention, there can be mentioned epoxidized soybean oil having an oxirane value of 5 to 10%, such as Epocizers W-100EL, W-100S, W-109EL, and P-206 supplied by Dainippon Ink and Chemicals, Inc., and epoxidized fatty acid esters having an oxirane value of 3 to 6%, such as Epocizers W-121, W-128, and W-131 supplied by Dainippon Ink and Chemicals, Inc. Among them, epoxidized soybean oil such as Epocizers W-100EL, W-100S, W-109EL, and P-206 are preferred.

As the barium- or zinc-containing compound (D) used for the gasket composition of the present invention, there can be mentioned salts of carboxylic acids represented by the following general formulae:

$$C_nH_{2n-1}COOH \ (n=5 \text{ to } 30) \qquad (I)$$

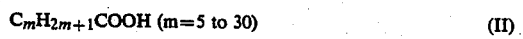

$$C_mH_{2m+1}COOH \ (m=5 \text{ to } 30) \qquad (II)$$

and

(III)

wherein R represents a hydrogen atom, a lower alkyl group, a methoxy group or an amino group.

Among these carboxylic acid salts, a salt of an unsaturated fatty acid of the general formula (I) in which n is 10 to 30, such as oleic acid, a salt of a saturated fatty acid of the general formula (II) in which m is 10 to 30, such as stearic acid, palmitic acid or lauric acid, and a salt of an aromatic carboxylic acid of the general formula (III), such as m-toluic acid, are preferred. The barium salt compound and the zinc salt compound may be used singly, but preferably the barium salt compound and the zinc salt compound are used in combination. When both salts are used in combination, preferably the weight ratio of the barium compound to the zinc compound is in the range of from 1/10 to 10/1. Furthermore, preferably the barium- or zinc-containing compound is used after dilution with a solvent to an appropriate viscosity (100 to 1,000 cP at 20° C.).

In order to improve the thermal stability of the barium or zinc compound, preferably a phosphite type chelating agent is added to the barium or zinc compound in an amount such that the weight ratio of the chelating agent to the barium or zinc compound is in the range of from 1/5 to 5/1.

The carboxylate or phosphate plasticizer, the epoxy type plasticizer, and the barium- or zinc-containing compound are incorporated into the vinyl chloride resin in amounts of 30 to 70 parts by weight, 0.5 to 10 parts by weight, and 0.1 to 5 parts by weight, respectively, per 100 parts by weight of the vinyl chloride resin.

If the amounts of the carboxylate or phosphate plasticizer, the epoxy type plasticizer, and the barium- or zinc-containing compound are outside the above-mentioned ranges in the gasket composition of the present invention, the flexibility and heat resistance of the gasket and the contamination resistance of the casting surface are degraded.

Calcium carbonate can be added as the filler in an amount of 3 to 30 parts by weight per 100 parts by weight of the vinyl chloride resin. As the calcium carbonate used for the composition of the present invention, there can be mentioned, for example, CCR supplied by Shiraishi Kogyo K.K.

The gasket composition comprising the above-mentioned ingredients can be formed into a desired shape by an extruder. For example, the composition can be shaped into a hollow member having a circular, ellipsoidal or rectangular section or a solid member having no hollow portion.

The gasket composition of the present invention is suitable for the preparation of a gasket for use in the production of shaped resin articles such as sheets and lenses by cast polymerization.

Any cast-polymerizable compound can be used as the polymerizable compound to be cast-polymerized by using a gasket formed from the gasket composition of the present invention. For example, there can be mentioned acrylic monomers such as acrylic acid and methacrylic acid, esters of acrylic acid and methacrylic acid with aliphatic, aromatic and alicyclic alcohols, and hydroxyalkyl esters and epoxy group-containing alkyl esters of acrylic acid and methacrylic acid; styrene type monomers such as styrene, α-methylstyrene and chlorostyrene; α,β-unsaturated carboxylic acids such maleic anhydride, fumaric acid and itaconic acid; and other unsaturated monomers such as acrylonitrile and vinyl acetate. A monomer or oligomer composed mainly of methyl methacrylate is especially preferably used for the cast polymerization.

Furthermore, the gasket composition of the present invention is effectively used for the formation of a gasket for use in the production of unsaturated polyesters and polydiethylene glycol diallyl carbonates by cast polymerization.

The above-mentioned compounds may be used singly or in the form of mixtures of two or more thereof. Further, a polyfunctional compound such as divinylbenzene or ethylene glycol dimethacrylate may be used in combination with the polymerizable compound, according to need. Moreover, additives such as an ultraviolet absorber and a polymerization regulator may be added.

Conventional mold sheets can be used for carrying out the cast polymerization by using gaskets formed from the gasket composition of the present invention. For example, there can be mentioned a tempered glass sheet, a chromium-plated metal sheet, an aluminum sheet, and a stainless steel sheet.

Cast polymerization can be carried out batchwise or in a continuous manner. As the polymerization initiator used for cast polymerization, there can be mentioned radical initiators such as azobisisobutyronitrile, azobis(2,4-dimethylvaleronitrile), benzoyl peroxide, lauroyl peroxide, 2,4-dichlorobenzoyl peroxide, isopropyl peroxydicarbonate, isobutyl peroxydicarbonate, isobutyl peroxide, and acetylcyclohexylsulfonyl peroxide.

Furthermore, a redox type polymerization initiator, for example, a combination of a peroxide and an amine, can be used.

These polymerization initiators may be used singly or in the form of mixtures of two or more thereof. The amount of the polymerization initiator used is 0.001 to 1 part by weight per 100 parts by weight of the polymerizable compound.

The cast polymerization is carried out at 45° to 95° C. for 0.3 to 15 hours, and then at 80° to 150° C. for 10 minutes to 5 hours.

The gasket composition of the present invention having the above-mentioned construction has a superior heat resistance to that of conventional casting gaskets, and does not contaminate the casting surface of a mold sheet. Accordingly, in cast polymerization, the great deal of labor required for washing and cleaning the casting surface of the mold sheet at every polymerization cycle can be saved and, therefore, the manufacturing cost can be greatly reduced.

The present invention will now be described in detail with reference to the following examples.

Note, all of "parts" and "%" in the examples are by weight. In the examples, the properties were evaluated according to the following methods.

(1) Heat Resistance of Gasket

The shaped gasket was allowed to stand for 30 minutes in a hot air heating furnace maintained at 160° C., and the degree of yellowing was checked with the naked eye. The heat resistance was evaluated according to the following standard.
A: no yellowing
B: slight yellowing
C: considerable yellowing
D: extreme yellowing (2) Contamination Resistance of Gasket The shaped gasket was cut into a length of 20 cm, and three cut pieces were inserted at intervals between casting surfaces of two tempered glass sheets having a size of 610 mm × 460 mm and the ends of the tempered glass sheets were tightened by clamps. The assembly was heated in a hot air heating furnace maintained at 150° C. for 1 hour, taken out and cooled. Then, the two tempered glass sheets were disassembled and the gasket pieces were removed. This operation was repeated twice by using other cut pieces of the same shaped gasket, and the degree of contamination of the casting surface was checked with the naked eye. Note, the gasket pieces were arranged at substantially the same positions at the respective tests.

The above-mentioned formed gasket was interposed between the peripheral edges of the two tempered glass sheets, which had been heat-treated and the gasket pieces interposed therebetween, whereby a cell was formed. Then, a polymerizable material composed of 100 parts of partially polymerized methyl methacrylate (polymer content=20%, viscosity=1,000 cP/20° C.), 0.05 part of azobisisobutyronitrile, and 0.005 part of dioctyl sulfosuccinate (release agent) was cast in the cell, and polymerization was carried out for 2 hours in warm water at 65° C. and then for 1 hour in an air bath at 120° C. After cooling, the formed resin sheet was released from the casting mold, the degree of contamination of the resin sheet by the gasket was checked with the naked eye, and the contamination resistance was evaluated according to the following standard.

A: no contamination
B: slight contamination
C: considerable contamination
D: extreme contamination

EXAMPLE 1

100 kg of a mixture comprising 100 parts of a vinyl chloride resin (Geon 101EP supplied by Nippon Geon Co.), 40 parts of DOP, 5 parts of Epocizer W-100S (oxirane value=6.8%; supplied by Dainippon Ink and Chemicals Inc.), and 2 parts of a barium- and zinc-containing stabilizer (ML-508C supplied by Dainippon Ink and Chemicals Inc., Ba content=10.2%, Zn content=1.4%) was blended by a Henschel mixer, and the composition was shaped into a tubular gasket having an outer diameter of 10 mm and an inner diameter of 8 mm. The heat resistance and contamination resistance of the gasket were evaluated. The obtained results are shown in Table 1.

EXAMPLE 2

A tubular gasket was made in the same manner as described in Example 1 from 100 kg of a composition comprising 100 parts of a vinyl chloride resin (Geon 101EP), 38 parts of DBP, 6 parts of Epocizer W-100EL (oxirane value=6.8%; supplied by Dainippon Ink and Chemicals Inc.), and 1.5 parts of a barium- and zinc-containing stabilizer (ML-508B supplied by Dainippon Ink and Chemicals Inc., barium content=9.3%, zinc content=1.8%), and the gasket was evaluated as in Example 1. The obtained results are shown in Table 1.

EXAMPLE 3

A tubular gasket was made in the same manner as described in Example 1 from a composition comprising 100 parts of a vinyl chloride resin (Geon 101EP), 48 parts of TOTM, 4 parts of Epocizer W-100EL, 0.2 part of barium oleate, 0.2 part of zinc laurate, and 2 parts of a phosphite chelating agent (Grek P-576J supplied by Dainippon Ink and Chemicals Inc.), and the gasket was evaluated as in Example 1. The obtained results are shown in Table 1.

EXAMPLE 4

A tubular gasket was made in the same manner as described in Example 1 from a composition comprising 100 parts of a vinyl chloride resin (Geon 101EP), 48 parts of TOTM, 4 parts of Epocizer W-100EL, and 0.4 part of barium oleate, and the gasket was evaluated as in Example 1. The obtained results are shown in Table 1.

EXAMPLE 5

A tubular gasket was made in the same manner as described in Example 4 except that 0.4 part of zinc laurate was used instead of barium oleate. The gasket was evaluated as in Example 1. The obtained results are shown in Table 1.

EXAMPLE 6

A tubular gasket was made in the same manner as described in Example except that 5 parts of calcium carbonate (CCR supplied by Shiraishi Kogyo) was further added to the composition used in Example, and the gasket was evaluated as in Example 1. The obtained results are shown in Table 1.

EXAMPLE 7

A tubular gasket was made in the same manner as described in Example 2 except that 10 parts of calcium carbonate (CCR) and 2 parts of a phosphite chelating agent (Grek P-576J) were further added to the composition used in Example 2. The gasket was evaluated as in Example 1. The obtained results are shown in Table 1.

TABLE 1

| | Gasket composition (parts) | | | | | | Heat resistance of gasket | Evaluation results | |
|---|---|---|---|---|---|---|---|---|---|
| | | | | | | | | Contamination resistance against gasket | |
| Example No. | Vinyl chloride resin | Carboxylate or phosphate plasticizer | Epoxy type plasticizer | Ba— or Zn— containing plasticizer | Calcium carbonate | Other additive | | Casting surface of mold | Resin sheet |
| 1 | 100 | DOP 40 | W-100S 5 | ML-508C 2 | — | — | A | A | A |
| 2 | 100 | DBP 38 | W-100EL 6 | ML-508B 1.5 | — | — | B | B | A |
| 3 | 100 | TOTM 48 | W-100EL 4 | Barium oleate 0.2 Zinc laurate 0.2 | — | P-576J 2 | A | A | A |
| 4 | 100 | TOTM 48 | W-100EL 4 | Barium oleate 0.4 | — | — | A | B | A |
| 5 | 100 | TOTM 48 | W-100EL 4 | Zinc laurate 0.4 | — | — | A | B | A |
| 6 | 100 | DOP 40 | W-100S 5 | ML-508C 2 | 15 | — | A | A | A |

TABLE 1-continued

| | Gasket composition (parts) | | | | | | Evaluation results | | |
|---|---|---|---|---|---|---|---|---|---|
| | | | | | | | Heat | Contamination resistance against gasket | |
| Example No. | Vinyl chloride resin | Carboxylate or phosphate plasticizer | Epoxy type plasticizer | Ba— or Zn— containing plasticizer | Calcium carbonate | Other additive | resistance of gasket | Casting surface of mold | Resin sheet |
| 7 | 100 | DBP 38 | W-100EL 6 | ML-508B 1.5 | 10 | P-576J 2 | B | A | A |

COMPARATIVE EXAMPLE 1

A tubular gasket was made in the same manner as described in Example 1 except that the stabilizer (ML-508C) was removed from the composition used in Example 1. The gasket was evaluated as in Example 1. The obtained results are shown in Table 2.

COMPARATIVE EXAMPLES 2 AND 3

Tubular gaskets were made in the same manner as described in Examples 2 and 3 except that the stabilizer (ML-508B), barium oleate, and zinc laurate were removed from the compositions used in Examples 2 and 3. The gaskets were evaluated as in Example 1. The obtained results are shown in Table 2.

COMPARATIVE EXAMPLE 4

A tubular gasket was made in the same manner as described in Example 2 except that the amount of the stabilizer (ML-508B) was increased to 10 parts in the composition used in Example 2. The gasket was evaluated as in Example 1. The obtained results are shown in Table 2.

COMPARATIVE EXAMPLE 5

A tubular gasket was made in the same manner as described in Example 6 except that the stabilizer (ML-508C) was removed and the amount of calcium carbonate (CCR) was reduced to 10 parts in the composition used in Example 6. The gasket was evaluated as in Example 1. The obtained results are shown in Table 2.

value of 5 to 10% and an epoxidized fatty acid ester having an oxirane value of 3 to 6%, and (D) 0.1 to 5 parts by weight of a stabilizer composed of at least one member selected from the group consisting of barium-containing compounds and zinc-containing compounds.

2. A gasket composition for cast polymerization according to claim 1, wherein the barium-containing compound or zinc-containing compound is a salt of carboxylic acid represented by the following formula:

$$C_nH_{2n-1}COOH \quad (n=5 \text{ to } 30) \qquad (I),$$

$$C_mH_{2m+1}COOH \quad (m=5 \text{ to } 30) \qquad (II),$$

(III)

wherein R is a hydrogen atom, a lower alkyl group, a methoxy group or an amino group.

3. A gasket composition for cast polymerization according to claim 1, wherein the stabilizer (D) comprises a barium-containing compound and a zinc-containing compound and the weight ratio of the barium-containing compound to the zinc-containing compound is in the range of from 1/10 to 10/1.

4. A gasket composition for cast polymerization according to claim 1, wherein the stabilizer (D) is a barium or zinc salt of an unsaturated fatty acid represented by the general formula (I):

TABLE 2

| | Gasket composition (parts) | | | | | | Evaluation results | | |
|---|---|---|---|---|---|---|---|---|---|
| | | | | | | | Heat | Contamination resistance against gasket | |
| Comparative Example No. | Vinyl chloride resin | Carboxylate or phosphate plasticizer | Epoxy type plasticizer | Ba— or Zn— containing plasticizer | Calcium carbonate | Other additive | resistance of gasket | Casting surface of mold | Resin sheet |
| 1 | 100 | DOP 40 | W-100S 5 | — | — | — | C | D | D |
| 2 | 100 | DBP 38 | W-100EL 6 | — | — | — | D | D | D |
| 3 | 100 | TOTM 48 | W-100EL 4 | — | — | — | C | D | D |
| 4 | 100 | DBP 38 | W-100EL 6 | ML-508B 10 | — | — | A | D | D |
| 5 | 100 | DOP 40 | W-100S 5 | — | 10 | — | C | D | D |

We claim:

1. A gasket composition for cast polymerization, which comprises (A) 100 parts by weight of a vinyl chloride resin, (B) 30 to 70 parts by weight of a plasticizer composed of at least one member selected from the group consisting of carboxylic acid esters and phosphoric acid esters, (C) 0.5 to 10 parts by weight of an epoxy type plasticizer selected from the group consisting of an epoxidized soybean oil having an oxirane $$C_nH_{2n-1}COOH \qquad (I)$$

wherein n is a number of from 10 to 30.

5. A gasket composition for cast polymerization according to claim 1, wherein the stabilizer (D) is a barium or zinc salt of a saturated fatty acid represented by the general formula (II):

$$C_mH_{2m+1}COOH \qquad (II)$$

wherein m is a number of from 10 to 30.

6. A gasket composition for cast polymerization according to claim 1, wherein the stabilizer (D) is a barium or zinc salt of toluic acid.

7. A gasket composition for cast polymerization according to claim 1, wherein the plasticizer (B) is a member selected from the group consisting of tributyl phosphate, dibutyl phthalate, dioctyl adipate, dioctyl phthalate, acetyltributyl citrate, trioctyl phosphate and trioctyl trimellitate.

8. A gasket composition for cast polymerization according to claim 1, which further comprises (E) 3 to 30 parts by eight of calcium carbonate per 100 parts by weight of the vinyl chloride resin (A).

9. A gasket for cast polymerization, which consists essentailly of (A) 100 parts by weight of a vinyl chloride resin, (B) 30 to 70 parts by weight of a plasticizer composed of at least one member selected from the group consisting of carboxylic acid esters and phosphorice acid esters, (C) 0.5 to 10 parts by weight of an epoxy type plasticizer selected from the group consisting of an epoxidized soybean oil having an oxirane value of 5 to 10% and an epoxidized fatty acid ester having an oxirane value of 3 to 6%, and (D) 0.1 to 5 parts by weight of a stabilizer composed of at least one member selected from the group consisting of barium-containing compounds and zinc-containing compounds.

10. A gasket according to claim 9, wherein the barium-containing compound or zinc-containing compound is a salt of carboxylic acid represented by the following formula:

$$C_nH_{2n-1}COOH \ (n=5 \ to \ 30) \qquad (I),$$

$$C_mH_{2m+1}COOH \ (m=5 \ to \ 30) \qquad (II),$$

or

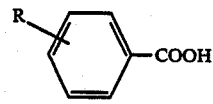
$$(III)$$

wherein R is a hydrogen atom, a lower alkyl group, a methoxy group or an amino group.

11. A gasket according to claim 9, wherein the stabilizer (D) comprises a barium-containing compound and a zinc-containing compound and the weight ratio of the barium-containing compound to the zinc-containing compound is in the range of from 1/10 to 10/1.

12. A gasket according to claim 9, wherein the stabilizer (D) is a barium or zinc salt of am insaturated fatty acid represented by the general formula (I):

$$C_nH_{2n-1}COOH \qquad (I)$$

wherein n is a number of from 10 to 30.

13. A gasket according to claim 9, wherein the stabilizer (D) is a barium or zinc salt of a saturated fatty acid represented by the general formula (II):

$$C_mH_{2m+1}COOH \qquad (II)$$

wherein m is a number of from 10 to 30.

14. A gasket according to claim 9, wherein the stabilizer (D) is a barium or zinc salt of toluic acid.

15. A gasket according to claim 9, wherein the plasticizer (B) is a member selected from the group consisting of tributyl phosphate, dibutyl phthalate, dioctyl adipate, dioctyl phthalate, acetyltributyl citrate, trioctyl phosphate and trioctyl trimellitate.

16. A gasket according to claim 9, which further comprises (E) 3 to 30 parts by weight of calcium carbonate per 100 parts by weight of the vinyl chloride resin (A).

* * * * *